United States Patent [19]
Hayafune

[11] 3,823,830
[45] July 16, 1974

[54] MAIN VALVE FOR ROTARY FILTERS
[75] Inventor: Yukio Hayafune, Tokyo, Japan
[73] Assignee: Tsukishima Kikai Co., Ltd., Tokyo, Japan
[22] Filed: Jan. 24, 1973
[21] Appl. No.: 326,574

[52] U.S. Cl................. 210/330, 210/402, 210/418
[51] Int. Cl...................... B01d 33/00, B01d 33/06
[58] Field of Search .......... 210/404, 392, 393, 395, 210/402, 330; 137/625.18, 625.19, 544, 545

[56] References Cited
UNITED STATES PATENTS
3,433,265   3/1969   Bartholet...................... 137/625.18
3,630,380   12/1971  Barnebl et al. .................... 210/404

*Primary Examiner*—Roy Lake
*Assistant Examiner*—James W. Davie
*Attorney, Agent, or Firm*—Stevens, Davis, Miller & Mosher

[57] ABSTRACT

A main valve having an exhaust port for filtrate and another exhaust port for gases, each being provided with an exchangeable baffle plate covered with wear resisting material. Mounted between the main valve and the wear plate is a main plate having an annular groove, in which the first and the second bridge blocks are fitted.

1 Claim, 5 Drawing Figures

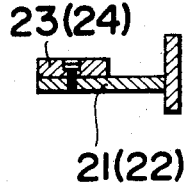

3,823,830

MAIN VALVE FOR ROTARY FILTERS

This invention relates to an improvement in rotary filters such as rotary pan filters, rotary drum filters, rotary disc filters and the like wherein a main valve is used for providing suction and pressure alternately to one or more filter units of the filtering device.

Conventional filter valves have the disadvantage of being subjected to abrasion of the inner wall of the valve due to mist, solid particles, etc. existing in the filtrate and/or suction gases which rapidly strike against the said wall, thus causing remarkable shortening of the service life of the valve proper.

The present invention therefore, seeks to provide a discharge valve free from such defects, in which, a plate having an annular groove apertured toward the filter members and bottom openings thereof corresponding to both filtrate and gas exhaust ports, is demountably provided on the side face of the discharge valve on the filter member side, the discharge valve being provided with the said two exhaust ports separately; a pair of bridge blocks is so fitted in the annular groove as to divide the said annular groove into the upper and lower sections; and baffle plates with wear resisting material covered on their striking contact surfaces are disposed demountably from the outside of the valve so that the contact surfaces correspond to portions where kinetic energy of the filtrate and/or gases being applied from the filter member side is maximum.

An object of the invention is to provide a filter valve which permits preventing abrasion of the main valve, and a second object is to prevent abrasion of the valve proper with the aid of the wear resisting material demountably arranged onto portions which are subjected to abrasion.

Other objects and aspects of the invention will become apparent from the following drawings in which:

FIG. 3 is a cross-sectional view taken along the line III—III of FIG. 2;

FIG. 4 is a view partly in section taken along the line IV—IV of FIG. 3 as viewed from the arrow direction; and FIG. 5 is a cross-sectional view taken along the line V—V of FIG. 2 as viewed from the arrow direction.

Figure 1:
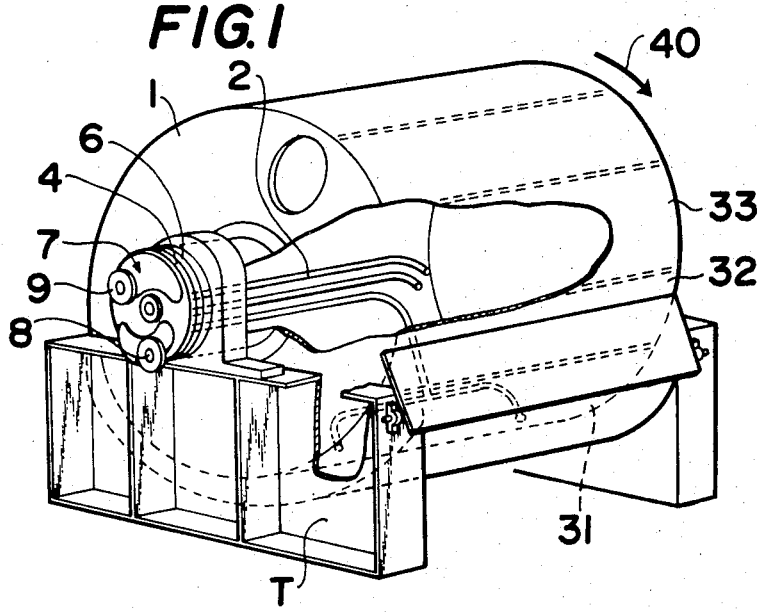
FIG. 1 is a perspective illustration of a rotary drum filter and main valve means thereof.

Referring now in detail to drawings, first to FIG. 1, it will be seen that each end 3 of a group of the filtrate discharge pipes 2 arranged inside the filter drum 1 in such a manner that they correspond to each filtering surfaces 31, 32, 33, . . . . of the said filter drum 1, is circularly disposed into the inner holes of the trunnion shaft 4 of the said filter drum 1 in the order of corresponding filtering surfaces. Fixed at the end of the trunnion shaft 4 is a wear plate 6 composed of a hard elastic material, having a group of small apertures 5 perforated in correspondance with each pipe end 3, and these members rotate together with the filter drum 1.

At the outer end of the said trunnion shaft 4, a main valve 7 is so disposed on a frame as to form a close abutment with the trunnion shaft 4. The main valve 7 is provided with a filtrate exhaust port 8 and a gas exhaust port 9 which are of the same structure and located symmetrically with reference to the diameter of the main valve. A main plate 10 is provided demountably on the drum side surface of the main valve where the main valve 7 is in contact with the wear plate 6.

Thus, the wear plate 6 which rotates together with the said filter drum 1 is in slidable and frictional contact with the main plate 10 at the contact surface 11. The plate 10 is provided with an annular groove 12 opposing to the said pipe ends 3 circularly disposed on the side of the wear plate 6.

Provided at the bottom 13 of the annular groove 12 are openings 14, 15 which are so arranged as to, at least, correspond to the filtrate exhaust port 8 and the gas exhaust port 9 of the main valve 7. The bottom 13 of this annular groove is also coupled to each exhaust port 8, 9 of the main valve 7 as shown in FIG. 3, and an opening 17 is formed at a void 16 in an appropriate section to which vacuum pressure is applied.

Figure 2:
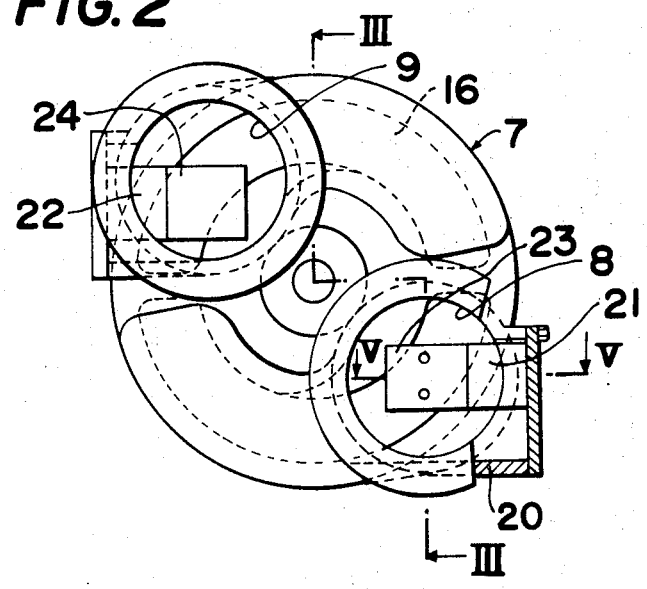
FIG. 2 is an elevation view of the main valve with portions broken away.

Now, assume, referring to FIGS. 1, 2 and 4, that the filter drum 1 rotates in the arrow direction 40, and the filter cloths forming the superficial filtering surfaces 31, 32, 33, . . . of the filter drum are forcibly susceptible to removal of cake and washing operation at the final stage of the filtering process; however, on the other hand, those of certain sections are not subjected to suction by means of the discharge valve 7. In the plate 10, as shown in FIG. 4, a bridge block 18 is fitted demountably in the section P-Q where it is not subjected to suction so that the annular groove 12 is blocked. A second bridge block 19 for blocking the annular groove 12 as above is also fitted demountably at a liquid level or the equivalent position at the rear of the rotating direction of the filter members, that is to say, on the outgoing side when the filtering surfaces get out of the liquid surface in the slurry tank at their final rotating stage after they enter the slurry tank. As a result, the vacuum pressure acting upon the filtrate exhaust port 8 is applied to the entire range of the section (X) in the plate 10 shown in FIG. 4, while the vacuum pressure acting upon the gas exhaust port 9 is applied to the entire range of the section (Y) thereof.

The aforementioned filtrate exhaust port 8 is disposed so that its center is positioned at a place where the pipe end 3 of the filtrate exhaust port comes when the filtrate first flows out after being filtered by the advancement of one filtering surface into the slurry tank (T). On the other hand, the gas exhaust port 9 is disposed so that its center is positioned at a place where the said pipe end 3 comes when air or gas is first sucked to flow out at the pressed water processing stage after the said filtering surface comes out of the liquid in the slurry tank.

Inserted and fixed into both exhaust ports 8, 9 through an openable insertion inlet 20 mounted on the wall side of the main valve 7 are the baffle plates 21, 22 whose end portions are positioned at places where the filtrate or gas being flowed out of each end of the above-mentioned pipes 2 strikes, and the said striking contact surfaces are demountably covered with wear resisting material 23, 24. Also, another wear resisting material 25 is demountably provided at the edge on the rotating direction side of the filter members, or, the side face on the filter member side of the said bridge block 18.

The apparatus being constructed as aforementioned according to this invention, a large flow of the first filtrate, when linearly flows into the filtrate exhaust port 8 of the discharge valve, will strike against the wear resisting material 23 of the said baffle plate 21, and then it is discharged through the filtrate exhaust port 8 after reducing its kinetic energy. Also, in the case of the gas exhaust port 9, the baffle plate 22 and wear resisting material 24 serve in the same manner against the gas flow being accompanied by the first pressed water containing a large content of mist or solid particles. Further in accordance with this invention, the friction due to rotation of the filter drum 1 is produced between the plate 10 and the wear plate 6 only and not produced with respect to the main valve 7. Therefore, when the wear resisting material for the baffle plates, plate 10, or bridge blocks 18, 19 in the annular groove are worn out, such parts concerned are exchangeable by removing the baffle plates through the insertion inlet 20 or by detaching the plate 10, thus assuring immediate remedy or restoration into normal service.

According to this invention as detailed above, since the operative and inoperative sections corresponding to filtering in the liquid bath, pressed water in the air, removal of cake, washing of the filter cloths, etc. can be defined at the operative positions of the discharge valve with the aid of application of the demountable bridge blocks, such portions that are subjected to abrasion can also be defined accordingly, thus permitting effective arrangement of wear resisting material at such portions required.

Furthermore, the wear resisting material thus disposed can be disassembled and exchanged independently without affecting any other component, thus facilitating maintenance of the apparatus and guaranteeing a longer service life of the discharge valve.

What I claim is:

1. A rotary filtering apparatus comprising a number of filter sections provided inside a slurry tank through which the slurry is filtered, a group of filtrate discharge pipes each within a filter section, a stationary main valve being in contact with the ends of each of said discharge pipes, a filtrate exhaust port and a gas exhaust port separately mounted on said main valve, a main plate mounted on the drum side surface of said main valve, and having an annular groove apertured toward said filter drum, said annular groove defining openings at the bottom of said groove corresponding to said two exhaust ports, bridge blocks demountably provided inside said groove of said main plate and baffle plates mounted inside said two exhaust ports, said filtrate exhaust port being located where filtrate flows out after being filtered by the advancement of a filter section into said slurry tank, and said gas exhaust port being located where the first air and gas is withdrawn.

* * * * *